Dec. 26, 1950 C. H. HATTERSLEY 2,535,736

FLIER FOR SPINNING AND LIKE MACHINES

Filed April 22, 1947 5 Sheets-Sheet 1

Inventor
Charles Henry Hattersley
By S. Soran
Attorney

Dec. 26, 1950 C. H. HATTERSLEY 2,535,736

FLIER FOR SPINNING AND LIKE MACHINES

Filed April 22, 1947 5 Sheets-Sheet 2

Inventor

Charles Henry Hattersley

By L. Lorral

Attorney

Inventor
Charles Henry Hattersley
By L. Lokal
Attorney

Dec. 26, 1950 C. H. HATTERSLEY 2,535,736

FLIER FOR SPINNING AND LIKE MACHINES

Filed April 22, 1947 5 Sheets-Sheet 4

Inventor
Charles Henry Hattersley
By L. Lokal
Attorney

FLIER FOR SPINNING AND LIKE MACHINES

Filed April 22, 1947

Inventor
Charles Henry Hattersley
By L. Sokol
Attorney

Patented Dec. 26, 1950 2,535,736

UNITED STATES PATENT OFFICE 2,535,736

FLIER FOR SPINNING AND LIKE MACHINES

Charles Henry Hattersley, Leeds, England

Application April 22, 1947, Serial No. 743,033

7 Claims. (Cl. 57—117)

The present invention relates to flyers for spinning and like machines, as used in the preparation of cotton, jute, flax, hemp, silk, synthetic and other fibres, of the general type in which the legs, tubes or barrels of the flyer (hereinafter called legs) are connected at the top by a transverse member which in turn is fixed to a central tubular driving socket. The upper portion of the socket has two opposite side holes for the work, said work coming from a supply bobbin, then passing through the central bore of the socket downwards and then through one of the said side holes to the top of one of the barrels or tubes and then through the tube downwards and finally, either directly through an eye or bush in the lower end of the tube, or over a radial oscillating presser arm and an eye at the end of the arm, on to the delivery bobbin which is located between the tubes of the flyer and has a rotary and a reciprocatory motion upon the driving spindle. The driving spindle has driving engagement with the lower portion of the driving socket, and the socket has driving connection with the transverse top member of the flyer.

The object of the invention is to improve the manufacture and the operation of the flyer, more particularly with a view to increasing its strength, reducing its weight, facilitating the threading of the work through the flyer, facilitating angular adjustment of the lateral holes in the socket, relatively to the tubes, and facilitating removal of fluffy matter deposited in transverse member around the socket, or preventing formation of deposits of fluffy matter.

With these objects in view the invention consists in the novel combination of features or parts and in the improved method of manufacture as set out in the appended claims.

The accompanying drawings show by way of example constructional forms of the invention. Figs. 1–6 show one construction of flyer in which the transverse member is provided with an internal reinforcing member, and a presser arm is mounted on a presser rod.

Fig. 11 is an elevation,

Fig. 12 is a top view corresponding to Fig. 11,

Fig. 13 is a side view corresponding to Fig. 11.

Fig. 14 is an elevation,

Fig. 15 is a side view corresponding to Fig. 14 seen from the left,

Fig. 16 is a top view corresponding to Fig. 14.

Fig. 17 is a section on line XVII—XVII of Fig. 14 showing presser arm.

Fig. 18 is a section similar to that shown in Fig. 17 showing presser arm in extreme operative position.

Fig. 22 is an axial section through the lower end of the leg,

Fig. 23 is a side view corresponding to Fig. 22,

Fig. 24 is an axial section through the lower end of a leg showing a second construction of bush, Fig. 25 shows in detail a member of the bush shown in Fig. 24.

Figures 1, 2, 3, 4, 5:
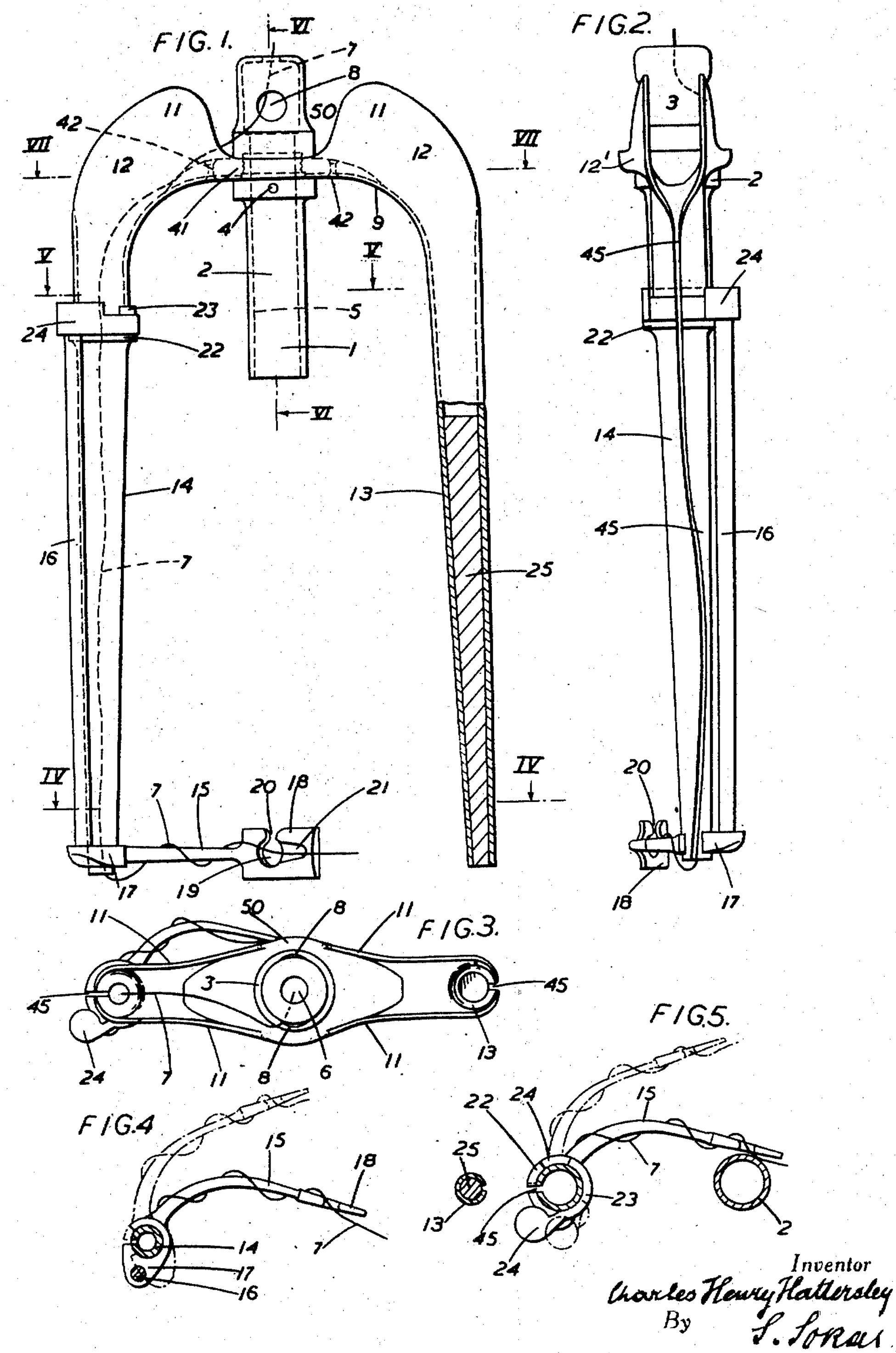
Fig. 1 is an elevation, partly in section.
Fig. 2 is a side view corresponding to Fig. 1, seen from the left.
Fig. 3 is a top view.
Fig. 4 is a section on line IV—IV of Fig. 1.
Fig. 5 is a section on line V—V of Fig. 1.

Referring to the drawings,

Figs. 1 to 7 show one form of cotton flyer.

Figure 8:
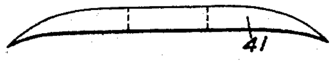
Fig. 8 is an elevation of the internal reinforcing member.
Figure 10:
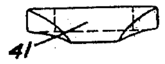
Fig. 10 is a side view corresponding to Fig. 8.
Figure 9:
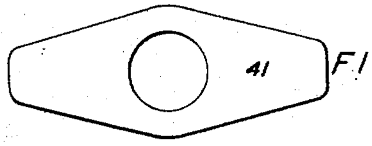
Fig. 9 is a top view corresponding to Fig. 8.

1 indicates the driving socket as a whole. This socket comprises a lower tubular member 2 and an upper tubular member 3. The lower member 2 has a transverse pin 4 by means of which it is driven from a driving spindle. The driving spindle (not shown) has a forked upper end engaging the pin 4. The bore 5 of member 2 and the corresponding surface of the driving spindle may be conical to ensure a good fit. The upper member 3 has a central bore 6 through which the work 7 enters and two side holes 8, 8 through one of which the work passes into the transverse top member. The transverse top member is as a whole designated by 9 and is of U-section having a flat bottom portion 10 and marginal upstanding ribs 11, 11. The flat bottom portion 10 is bulged at 12', as may be seen in Figure 2, and is strengthened by an internal reinforcing member 41 which is fixed to the bottom 10 by soldering, brazing or welding and by two rivets 42. This member 41 is shown separately in Figs. 8–10. The height of the upstanding marginal ribs 11, 11 is considerable at both ends of the transverse top member, but is greatly reduced in the middle, as clearly shown in Fig. 1, so that opposite the socket part 3 the upper surfaces of the reinforcing member 41 and the ribs are flush and form a smooth uninterrupted surface (see Fig. 6), and there is a wide gap 50 in the ribs 11, 11 opposite the socket part 3. This prevents formation of deposits of fluffy matter separated from the rove, and/or facilitates removal of such fluffy matter.

Figure 11:
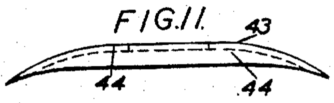
Figs. 11 to 13 show another construction of the internal reinforcing member.
Figure 13:
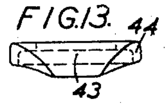
Figure 12:
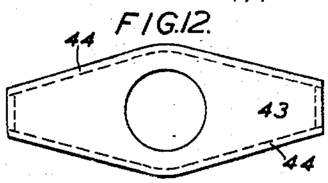
Figure 19:
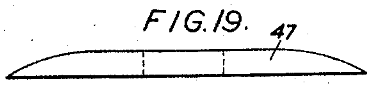
Figs. 19 to 21 show external reinforcing member in elevation, top view and side view, respectively.
Figure 21:
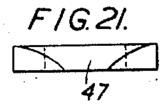
Figure 20:
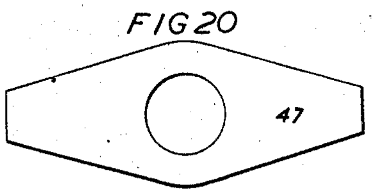
Figure 7:
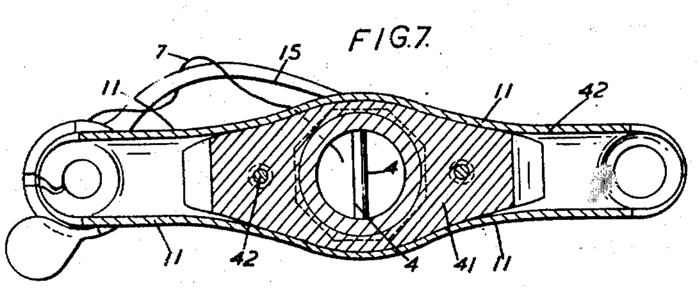
Fig. 7 is a section on line VII—VII of Fig. 1 drawn to a larger scale.
Figure 14:
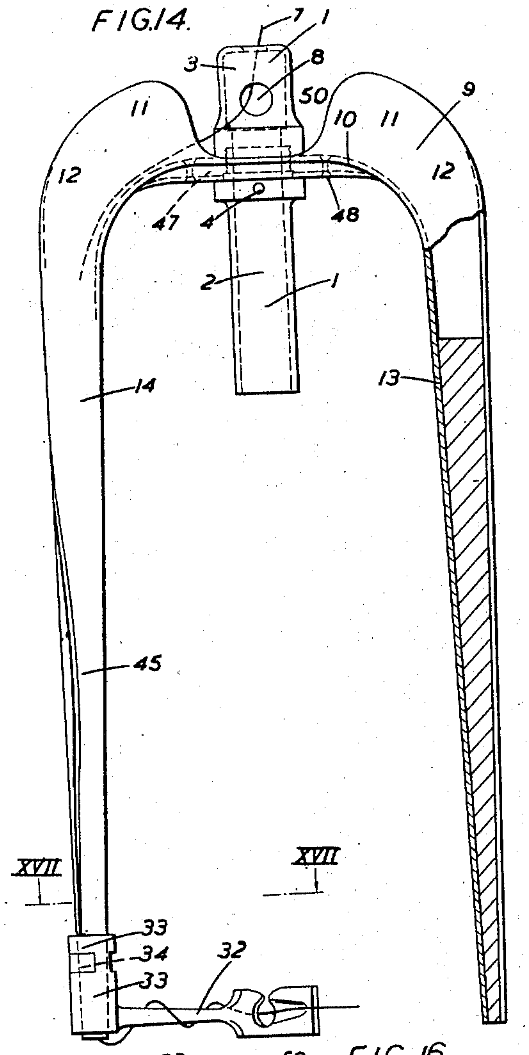
Figs. 14 to 18 show a second construction of flyer in which the transverse member is provided with an external reinforcing member and in which the presser rod shown in the first construction is omitted.
Figure 15:
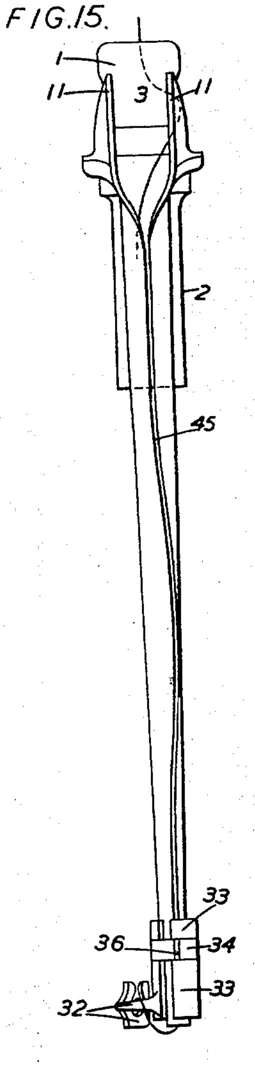
Figure 16:
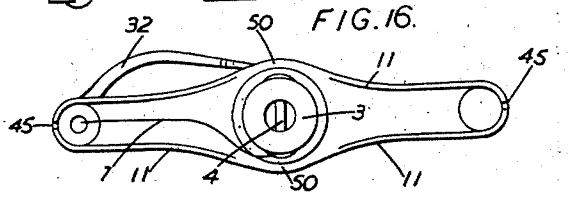
Figure 17:
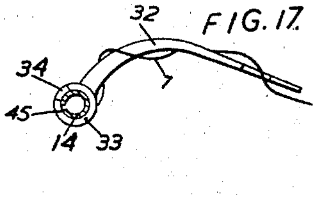
Figure 18:
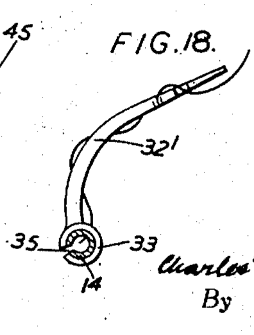

Figs. 11 to 13 show an alternative construction of reinforcing member (for use with the flyer of Figs. 1 to 5), designated by the numeral 43, in which said member is formed on its underface with a peripheral rib 44. The member 43 may be fixed to the upper surface of the bottom 10 in the same way as member 41, and its upper surface must lie flush with the marginal ribs.

The width of the transverse top member diminishes towards its ends and the ribs 11, 11 are curved to form bends 12, 12 merging into tubular legs 13, 14. The legs 13, 14 are formed with continuous slots 45, 45 which extend down to the ends of the legs. These slots 45, 45 greatly facilitate the threading of the cotton work through the flyer. As shown in Fig. 2 the slots are not in a straight line but are curved to prevent accidental escape of the cotton during operation.

The flyer is provided, on the leg 14, with a presser for guiding the work on to a bobbin (not shown). The presser consists of a presser arm 15 and the presser rod 16. The presser arm 15 has a hub 17, which embraces the lower end of leg 14, and an end plate 18 with an eye 19, a slot 20 and a recess 21. The cotton 7 issuing from the end of leg 14 is wound round arm 15 and inserted through slot 20 into the eye 19 and recess 21. A collar 22 having a stop 23 is fixed, for instance by brazing, to the top of leg 14. The rod 16 is fixed to the hub 17 and is turnably mounted on collar 22 by means of a grip 24 fixed to the top end of the rod 16. The stop 23 limits the angular movement of the grip 24 and consequently of the presser arm 15 in both directions. The initial position of arm 15 is shown in full lines and the extreme or end position by chain lines, in Figs. 4 and 5. In order to balance the weight of the presser, the leg 13 is to the required extent filled with balancing material 25, for instance, lead. This may, if required, be fixed to the leg by pins or any other suitable means.

Figure 6:
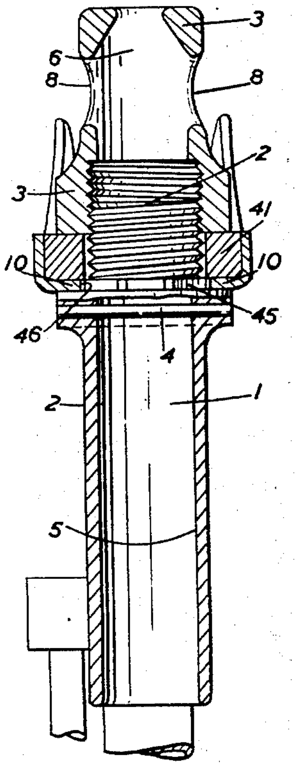
Fig. 6 is a section on line VI—VI of Fig. 1, drawn to a larger scale.

As shown in Fig. 6, the upper reduced end of the lower part 2 of the socket screws into the lower end of the upper part 3 of the socket. The bottom portion 10 of the transverse top member, and the reinforcing member 41 are clamped between the two socket parts 2 and 3. The socket part 2 has an octagonal shoulder 45 engaging an octagonal hole 46 in the bottom 10 of the transverse top member. This enables the socket part 3 with the holes 8, 8 to be adjusted angularly with regard to socket part 2 and the transverse top part 10, 11.

The construction of cotton flyer shown in Figs. 14–21 differs from that previously described in that the presser is of a simplified construction and that the reinforcing member is fixed to the under surface of the transverse top. The hub 33 of the arm 32 is mounted on a collar 34 fixed upon leg 14, by brazing or in any other suitable manner. The collar 34 both supports, and limits the rotation of, the arm. The two legs 13 and 14 have slots 45 as in the previous construction. Both the collar 34 and the hub 33 have slots 35, 36 which in the extreme position of the arm 32' shown in Fig. 18 register with the slot 45 of the leg.

The reinforcement member 47 (shown in detail in Figs. 19 to 21) is arranged under the bottom 10 of the transverse top member and is firmly connected thereto by soldering, welding or brazing, and by rivets 48, 48. The bottom 10 and the member 47 are clamped between the two parts 3 and 2 of the socket 1. The gaps 50, 50 extend down to the bottom 10.

Figs. 22 to 25 show two bush constructions suitable for use with the improved flyer, particularly in the preparation of work other than cotton, for instance, jute, hemp, flax, silk and like fibres, where no presser arm is required. The lower end 55 of each of the legs, here designated by the numeral 56, is formed with a hole 57. Into this hole is inserted an internal bush part 58 which has an outer flange portion 59, a middle portion 60 fitting the hole 57 and a projecting portion 61. Upon the portion 61 is placed a ring 62 and the portion 61 is then expanded, by spinning or by other means, so as to clamp the ring 62. In the construction shown in Figs. 24 and 25, the ring 62 is replaced by a split ring 63 which is sprung into a groove 64. In both constructions the leg end 55 may be formed with a reinforcing flange 65. The advantages of using a two-part bush inserted into a hole of the leg end, instead of the usual construction in which a one-part bush is clamped in the forked end of the leg, are that the leg end is not weakened and that the bush may be easily exchanged when worn.

As previously stated, the making of the transverse top member and the two slotted legs in one piece from a single blank by cold pressing, is an important feature of the invention. The process for making the flyer body will now be described with reference to Figs. 26 to 37.

Figures 22, 23, 24, 25, 26, 27, 28, 29:
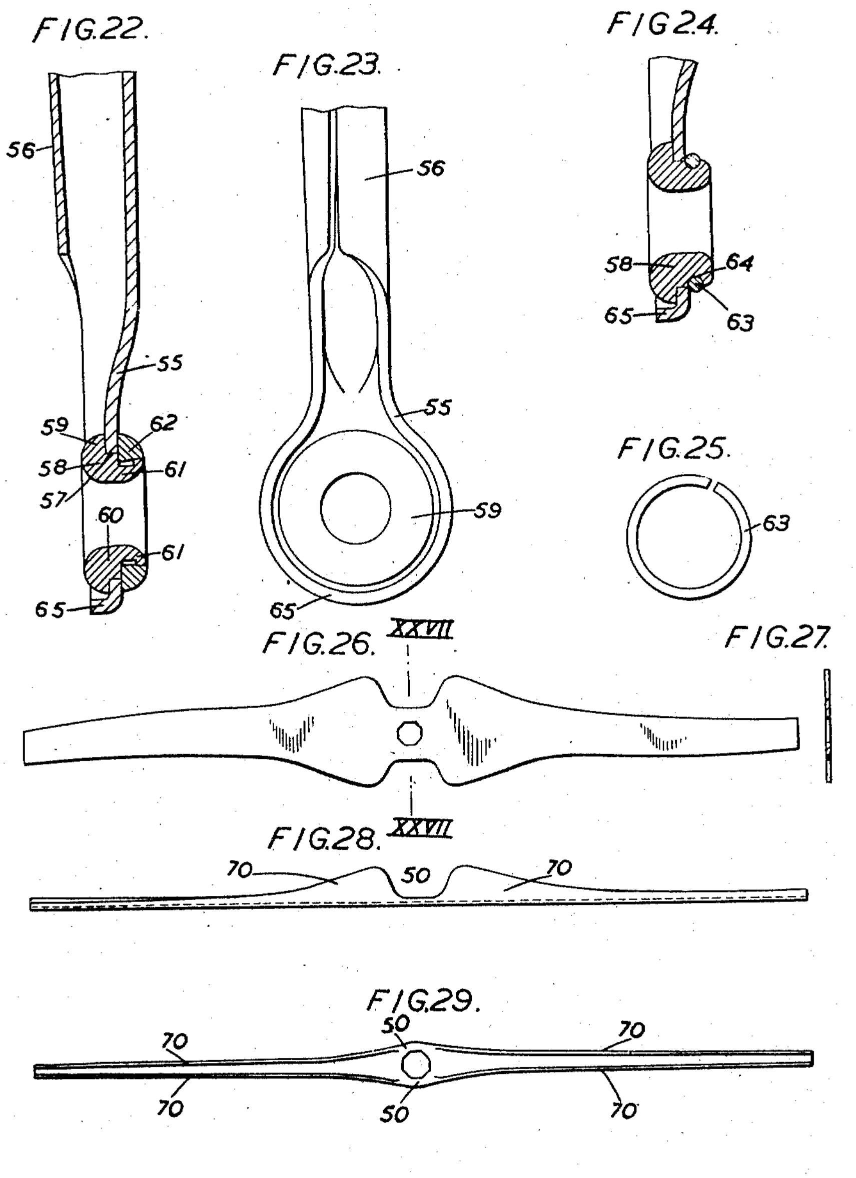
Figs. 22–23 and 24–25 show two constructions in which the lower end of the leg is provided with a bush (instead of a presser arm).
Figs. 26 to 37 show diagrammatically the process for making the flyer by cold pressing.
Figure 30:
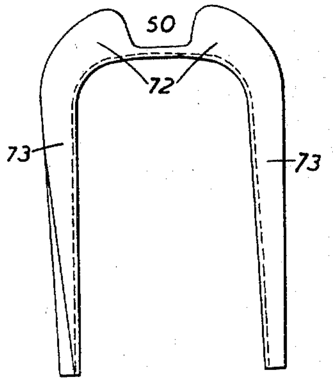
Figure 31:
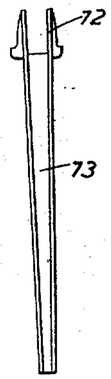
Figure 32:
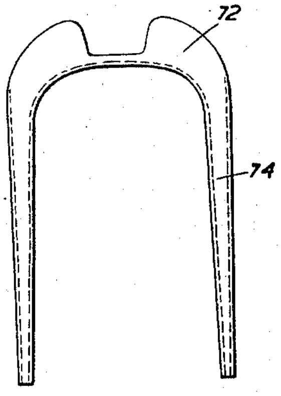
Figure 33:
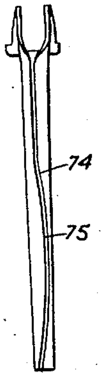
Figure 34:
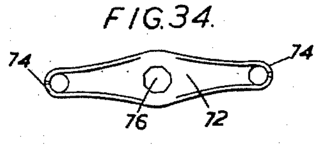
Figure 35:
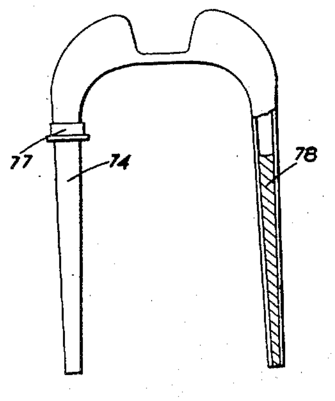
Figure 36:
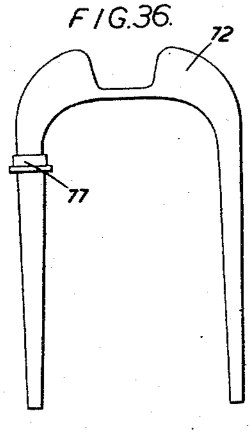
Figure 37:
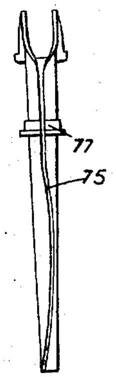

A blank of uniform thickness and of a suitable size and shape, as shown in Figs. 26 and 27, is prepared. The blank is then rounded off at the edges. The blank is then flanged to produce the shape shown in Fig. 28 (elevation) and Fig. 29 (plan), in which vertical ribs 70, 70 are formed along the edges. These ribs have rounded recesses 50, 50 in the middle and decrease in height towards the ends. The width of the bottom of the blank also decreases from the centre towards the ends. The blank is then blocked on a suitable former to the shape shown in Fig. 30 in front elevation and in Fig. 31 in end view, the portion 72 representing the future transverse top member and the portions 73, 73 the future legs of the flyer. The two sides or ribs of the legs are then closed, as shown in Figs. 32 to 34, to form hollow slotted legs 74, 74 and the width and the shape of the slot 75 will be according to the shape and size of the original blank (Fig. 26). An octagonal hole 76 is then pierced in the bottom of 72, as shown in Fig. 34 which is a top view corresponding to Fig. 32. A collar 77 for the presser rod is now fixed on one leg 74 and a lead weight 78 is placed inside the other leg (see Figs. 35–37).

I claim:

1. In a flyer of the type referred to, the combination of a driving socket and a one-piece structure of sheet metal of uniform wall thickness having an integrated slip-band structure and comprising two tubular legs and a transverse top member formed with a bottom portion of two upstanding marginal ribs formed with gaps adjacent to the socket, the bottom portion being substantially wider at the center of the flyer than the bottom of the socket and wider than the distance between the top marginal ribs on opposite sides of the transverse member.

2. In a flyer of the type referred to, the combination of a driving socket and a one-piece structure of sheet metal of uniform wall thickness having an integrated slip-band structure and comprising two tubular legs and a transverse top member formed with a bottom portion and two upstanding marginal ribs formed with gaps adjacent to the socket, the bottom portion being substantially wider at the center of the flyer than the bottom of the socket and wider than the distance between the tops of the marginal ribs on opposite sides of the transverse member, and the gaps in the marginal ribs extending substantially to the upper surface of said bottom portion, said bottom portion having driving engagement with said socket.

3. In a flyer of the type referred to, the combination of a driving socket and a one-piece structure of sheet metal of uniform wall thickness having an integrated slip-band structure and comprising two tubular legs and a transverse top member formed with a bottom portion and two upstanding marginal ribs formed with gaps adjacent to the socket, the bottom portion being substantially wider at the center of the flyer than the bottom of the socket and wider than the distance between the tops of the marginal ribs on opposite sides of the transverse member, and the gaps in the marginal ribs extending substantially to the upper surface of said bottom portion, said socket having a non-circular portion and said bottom portion having a correspondingly shaped hole engaged by said non-circular portion.

4. In a flyer of the type referred to, the combination of a driving socket and a one-piece structure of sheet metal of uniform wall thickness having an integrated slip-hand structure and comprising two tubular legs and a transverse top member formed with a bottom portion and two upstanding marginal ribs formed with gaps adjacent to the socket, the bottom portion being substantially wider at the center of the flyer than the bottom of the socket and wider than the distance between the tops of the marginal ribs on opposite sides of the transverse member, said socket being made in two parts adapted to screw one into the other and clamp between them said transverse top member, one of the said parts having a non-circular portion; said bottom portion having a correspondingly shaped non-circular hole, engaging said non-circular portion of one of the socket parts.

5. In a flyer of the type referred to, the combination of a driving socket and a one-piece structure of sheet metal of uniform wall thickness having an integrated slip-band structure and comprising two tubular legs and a transverse top member formed with a bottom portion and two upstanding marginal ribs formed with gaps adjacent to the socket, said bottom portion being bulged around said socket whereby to provide a greater clamping area around the socket, and said bulge extending beyond the ribs.

6. In a flyer of the type referred to, the combination of a driving socket and a one-piece structure of sheet metal of uniform wall thickness having an integrated slip-hand structure and comprising two tubular legs and a transverse top member formed with a bottom portion and two upstanding marginal ribs formed with gaps adjacent to the socket; and a reinforcing member secured to said bottom portion and of a width greater than the outside width of the driving socket; said driving socket being made of two parts screwed one into the other, said bottom portion and said reinforcing member being clamped between said two parts of said socket.

7. In a flyer of the type referred to, the combination of a driving socket and a one-piece structure of sheet metal of uniform wall thickness having an integrated slip-band structure and comprising two tubular legs and a transverse top member formed with a bottom portion and two upstanding marginal ribs formed with gaps adjacent to the socket, the bottom portion being wider than the distance between the ribs; and a reinforcing member extending transversely the whole width of the said bottom portion between the marginal ribs and over the whole length of the said gaps in said ribs.

CHARLES HENRY HATTERSLEY.

REFERENCES CITED

The following references are of record in the file of this patent:

UNITED STATES PATENTS

| Number | Name | Date |
|---|---|---|
| 5,892 | Marguis | Oct. 31, 1848 |
| 41,268 | Aldrich | Jan. 19, 1864 |
| 816,701 | Beckwith | Apr. 3, 1906 |
| 1,008,598 | Houghton | Nov. 14, 1911 |
| 1,047,601 | Woodworth | Dec. 17, 1912 |
| 1,230,272 | Burlin | June 19, 1917 |
| 1,426,443 | Aldrich | Aug. 22, 1922 |
| 1,512,220 | Harnett | Oct. 21, 1924 |
| 1,513,352 | Thompson | Oct. 28, 1924 |
| 1,547,361 | Carlson | July 28, 1925 |
| 1,752,111 | Rutherford | Mar. 25, 1930 |

Certificate of Correction

Patent No. 2,535,736

December 26, 1950

CHARLES HENRY HATTERSLEY

It is hereby certified that error appears in the printed specification of the above numbered patent requiring correction as follows:

Column 5, line 7, for the words "of two" read *and two*; line 52, and column 6, line 20, for "slip-hand" read *slip-band*;

and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*